Sept. 30, 1952  FITZ-HUGH B. MARSHALL ET AL  2,612,610
RADIATION DETECTOR
Filed Nov. 6, 1948
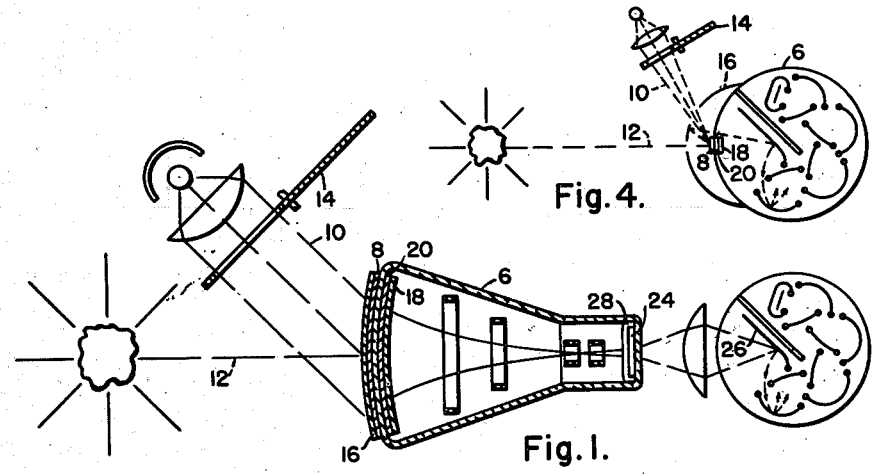
Fig. 4.
Fig. 1.
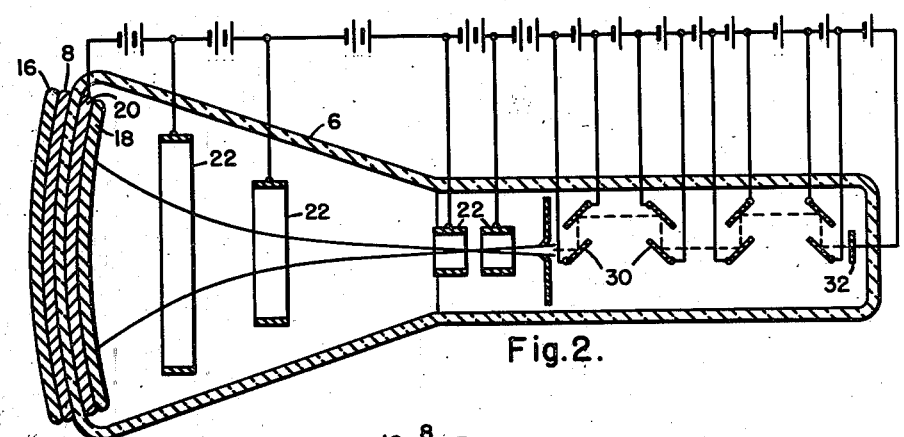
Fig. 2.
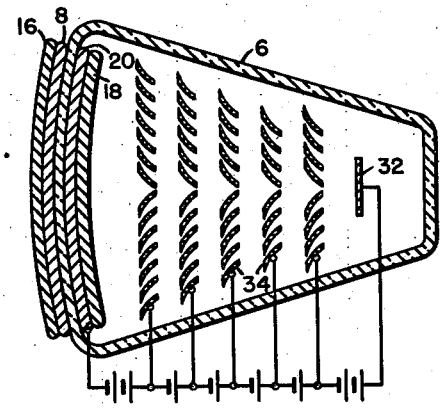
Fig. 3.
WITNESSES:
Robert C. Baird
Marcus W. Dodd
INVENTORS
Fitz-Hugh B. Marshall &
John W. Coltman.
BY
Hymen Diamond
ATTORNEY Patented Sept. 30, 1952

2,612,610

UNITED STATES PATENT OFFICE 2,612,610

RADIATION DETECTOR

Fitz-Hugh B. Marshall, Glenshaw, and John W. Coltman, Pittsburgh, Pa., assignors to Westinghouse Electric Corporation, East Pittsburgh, Pa., a corporation of Pennsylvania Application November 6, 1948, Serial No. 58,712

10 Claims. (Cl. 250—71)

Our invention relates to radiation detection, and more particularly relates to detection of high-energy radiation such as alpha, beta, gamma and X-rays.

In the prior art devices of which we are aware, considerable difficulties have been encountered in avoiding the dark-current effects which are inherent in electron multipliers. By dark-current we mean that current which is present in the tube when no radiation is incident on the input phosphor. Attempts have been made to overcome this by obtaining higher concentrations of the electrons from the input phosphor-photoelectric surface combination but the possibilities in this method are limited.

It is accordingly an object of our invention to provide apparatus for the detection of high-energy radiations with a large current output for measuring weak radiation.

Another object of our invention is to provide apparatus for the detection of high-energy radiation which produces a minimum of dark-current effects.

An ancillary object of our invention is to provide better apparatus for amplifying the current produced from a radiation detecting phosphor as a result of small quantities of radiation impinging on the detecting phosphor.

In accordance with the present invention, we provide a radiation detector including a storing phosphor which is capable of storing a large amount of energy and which stores this energy over relatively long periods until stimulated by stimulating radiation and which releases this energy rapidly as light when stimulated by the stimulating radiation. This stimulating radiation is any type of radiant energy which expedites the release of light from a phosphor. This may be infra-red radiation or radiation of other wave lengths which will expedite the release of light and which can be separated from ordinary light by optical filters or comparable means. Heat even though not transmitted as radiant energy is an alternative for stimulation, and is meant to be included within the scope of the expression stimulating radiation as used herein. The light from the storing phosphor impinges on a photoelectric surface which emits electrons immediately when the light impinges on it.

A storing phosphor of small area may be used in certain situations where the interception by the phosphor of a narrow beam of radiation is sufficient. Under such circumstances, the light from the storing phosphor may be collected and projected directly on the photoelectric cathode of a photo-multilplier.

Where a large phosphor is used, the sensitivity to radiation is increased in proportion to the increased area of the phosphor as a broad beam of radiation may be intercepted. However, a problem arises in the effective utilization of the light emitted from all elementary areas of a broad beam radiation detector such as this. In accordance with an important specific embodiment of our invention, the light from the large phosphor is projected directly on a large photoelectric layer separated from the phosphor only by a thin transparent sheet, and the resulting electrons emitted by the photoelectric layer are concentrated by suitable magnetic or electric fields.

The high energies given to the electrons by the electric focusing fields may be employed for amplification. The high-energy electrons may be allowed to strike one or more electrodes of a material which is capable of secondary emission. This would result in several electrons being given off for each electron which strikes an electrode thus producing an amplification of the electron current.

According to the broader aspects of our invention, amplification may be achieved also by allowing the electrons accelerated by the focusing fields to impinge on an electron phosphor causing the release of several photons. These photons may be focused on a photoelecertic layer where they will cause the release of more electrons. the electron stream emitted by the latter photoelectric layer may be further amplified by secondary emission. The second electron-phosphor photoelectric layer has the advantage, in addition to amplification, of allowing one to start again with the electrons at a negative potential since no energy is lost in carrying photons from a highly positive to a highly negative potential. This enables one to employ lower voltages than would otherwise be required.

The novel features that we consider characteristic of our invention are set forth with particularity in the appended claims. The invention itself, however, both as to its organization and its method of operation together with additional objects and advantages thereof will best be read in connection with the accompanying drawing, in which:

Figure 1 is a schematic showing of a broad-beam radiation detector suitable to embody the principles of our invention for certain purposes.

Fig. 2 is a schematic showing of a broad-beam radiation detector employing the secondary emission amplifier of Fig. 1 as an integral part of the tube instead of externally as shown in Fig. 1, with the intermediate electron phosphor and photosensitive surface omitted.

Fig. 3 is a schematic showing of a broad-beam radiation detector where the focusing is obtained by deflection of the electrons and amplification is obtained by secondary emission.

Fig. 4 is a schematic showing of a radiation detector employing a screen of small area.

Referring in detail to the drawing, a glass envelope 6 is coated on the outside at one end with a storing phosphor 8 sensitive to the radiation to be detected. This storing phosphor should be capable of storing energy over a relatively long period until stimulated by a stimulating radiation 10 and should be capable of releasing this energy rapidly as light photons when stimulated by a stimulating radiation 10. The energy which is stored is that of the detected radiation 12. There are several such phosphors now available commercially such as a cadmium zinc sulphide or zinc sulphide.

Focused on the storing phosphor is a stimulating radiation 10 as described before. The stimulating radiation is controlled so as to flood the storing phosphor 8 periodically for a period which in length is a small fraction of the length of the period during which no stimulating radiation is present. If a storing phosphor is employed of stantium sulphide activated by cerium and samarium, the stimulating radiation should be of about 10,000 angstroms. With a cesium antimony storing phosphor, there is a high sensitivity at 6,000 angstroms.

This can be achieved by the use of a rotating disc 14 with an aperture in it. While the aperture is between the source of stimulating radiation and the storing phosphor photons will be emitted by the storing phosphor. While the solid part of the disc is between the source of stimulating radiation and the storing phosphor, substantially no photons will be emitted by that phosphor.

Coated over this input phosphor may be placed a reflecting surface 16 capable of reflecting the light emitted by the input phosphor while being transparent to the radiation to be detected. Examples of this reflecting layer, which may be used for certain radiation are white cardboard or thin aluminum. The chief requirement for this reflective coating is that the radiation to be detected will penetrate it. If this reflecting layer is opaque to the infra-red or the incident radiation, an opening is of course necessary to permit entry of the incident radiation or infra-red, as shown in Fig. 4.

Inside the envelope opposite the storing phosphor, is a light-sensitive photosurface 18. This light-sensitive photosurface is capable of absorbing the light photons emitted by the storing phosphor 8 and emitting electrons as a result thereof, immediately. An example of such a substance is cesiated antimony.

Between the storing phosphor 8 and the light-sensitive photosurface 18 is a transparent electrically conducting coating 20, such as the material manufactured by the Pittsburgh Plate Glass Company, under the trade name of Nesa, which is transparent to the photons emitted by the storing phosphor 8. This transparent conducting coating enables us to replace the electric charge lost by photoelectric emission, thus maintaining the required potential on the photosensitive surface. A filter may also be desirable between the storing phosphor and the light-sensitive phosphor if materials are employed such that the stimulating radiation will cause emission of electrons from the light-sensitive phosphor. This filter would be transparent to the photons emitted by the storing phosphor and opaque to the stimulating radiation.

The electron current emitted by the incident radiation 10 from the photoelectric layer 18 may be amplified in a photo-multiplier tube as shown in Fig. 4. The construction and operation of the photo-multiplier tube is old in the art and will therefore not be described here.

The electrons emitted from the photoelectric layer by the photons from the storing phosphor may also be accelerated and focused by electron optics of which the principles are well known in the art. This is accomplished preferably by a series of charged rings 22 successively at a higher potential and with their centers in a straight line from the center of the input phosphor 8 to the center of the electron-sensitive phosphor 24. This electron phosphor 24 may be any of several substances such as zinc sulphide phosphor. The electron-sensitive phosphor 24 is preferably at the opposite end of the tube from the input phosphor 8. The electron-sensitive phosphor 24 absorbs the electrons impinging upon it and emits light photons. The photons emitted by the electron phosphor pass through the glass envelope and are focused by a lens on the photoelectric cathode 26 of a photo-multiplier tube. The construction of the photo-multiplier tube is not claimed in this invention and is shown only to demonstrate the complete process. The photo-multiplier tube must of course be sensitive to the radiation emitted by the electron phosphor 24.

The electron phosphor-photoelectric layer combination 24, 26 between the focusing fields and the amplification fields has the advantage of amplifying the current by producing several photons for each of the high-energy electrons impinging on the electron phosphor. The larger number of photons cause the emission of the larger number of electrons from the photoelectric layer thus producing larger current than was present during focusing. The electron phosphor-photoelectric layer combination between the focusing fields and the amplifying fields also has the advantage of separating the two fields. This allows one to employ a negative potential at the beginning of the second amplification stage, while employing a highly positive potential at the end of the focusing stage. Otherwise the field between the first part of the amplifying stage and the last part of the focusing stage would almost if not entirely stop the electrons.

In one embodiment of our invention, the electron phosphor may be backed by a reflecting layer 28, such as a thin coating of aluminum, which is transparent to the beam of electrons but which will reflect the light photons emitted by the electron phosphor so as to cause a greater concentration of photons to impinge on the photo-multiplier tube.

The reflecting layer 28 is not essential and may be omitted if desired. By omitting this layer, the photons going back into the interior of the envelope and striking the photoelectric layer 18 would cause further emission of electrons and thus increase the strength of the pulse.

As shown in Fig. 2, it is not necessary that an output phosphor be employed with an external photo-multiplier tube. Instead electrodes 30 may be placed inside of the tube to receive the current of electrons released from the photoelectric layer by the photons from the storing phosphor and amplify the current by secondary emission employing the same principles as are employed in the photo-multiplier tube. The electron beam is focused on a first electrode where several additional electrons are emitted. These are then attracted to a second electrode where again several additional electrons are emitted. After continuing this process with several electrodes, the final stream which has been greatly amplified is focused on an anode 32. Each successive electrode is at a higher potential than the preceding electrode and the electrodes are so placed that the electrons will be attracted successively from one to another until they finally impinge on the anode.

The potential of the first of the amplifying electrodes is preferably higher than the potential of the last of the focusing electrodes. However, in accordance with the broader aspects of our invention this is not necessary. The first of the amplifying electrodes may be only slightly more positive than the potential of the transparent electrically conducting coating between the storing phosphor and the light-sensitive photoelectric surface at the input end of the envelope. This will cause the electrons to slow down after passing the last of the focusing electrodes but still allow them to impinge on the first amplification electrode and cause the emission of some secondary electrons although not as many as with a positive potential difference between the last focusing electrode and the first amplification electrode.

An alternative method of focusing is shown in Fig. 3. Here, the electrons emitted by the sensitive phosphor are attracted to a first row of plates 34. These plates are at an angle of roughly 45 degrees with the path of the electrons and produce a field which is so oriented as to cause the electrons emitted from a plate to move toward an anode 32 centrally located at the opposite end of the tubes. This method of focusing is employed by R. C. A. in their image orthicon. An electron impinging on one of these plates will cause the emission of several more electrons which then proceed to a second row of plates where the process is repeated. This continues through several rows of plates, each row tending to focus the electrons closer together until they finally impinge on the anode. Each successive row of electrons is positively charged with respect to the preceding row so as to cause an acceleration of the electrons from the preceding row toward the succeeding row.

The radiation to be detected impinges on the storing phosphor 8 where it is absorbed. The storing phosphor stores the energy of the incident radiation until flooded by the stimulating radiation 10. When flooded, by the stimulating radiation 10, the storing phosphor emits photons which pass through the glass envelope and impinge on the photoelectric layer. The photoelectric layer absorbs the photons and emits electrons as a result thereof. These electrons are accelerated by the field produced by the transparent conducting layer and the successive ring electrodes 22. These rings are so oriented and a potential is so applied to them as to cause the electrons to tend to come to a focus. The stream of electrons thus focused is caused to impinge upon the output phosphor 24. The output phosphor absorbs the electrons and gives off light immediately. The light may then be focused on the cathode 26 of a photo-multiplier tube for further amplification. In the photo-multiplier tube, electrons are emitted from the cathode and are successively accelerated from one electrode to another, each time gaining additional electrons in the group due to secondary emission until they finally impinge upon an anode. By the time the electrons impinge upon the anode, the current has been greatly amplified.

By employing the storing phosphor and the stimulating radiation, we cause the energy of the radiation to be detected, which has been collected by the storing phosphor over a comparatively long period to be released and amplified in one pulse which may be of short duration. The duration preferably is 1/100 of the time interval during which the energy of the radiation to be detected is being stored. The dark-current noise which is present during this short interval is the characteristic dark current and is small in proportion to the strength of the signal pulse current. At the same time, we have achieved considerable amplification by releasing a large number of electrons at one time, thus starting with a stronger pulse to be amplified.

While there are very definite advantages, as described above, to employing the storing phosphor 8 and the stimulating radiation 10 in conjunction with the methods of amplification described herein, these methods of amplification may be employed without use of the storing phosphor. This may be achieved by employing an input phosphor sensitive to the radiation to be detected and capable of emitting photons immediately as a result thereof and a photoelectric phosphor capable of absorbing the photons emitted by the input phosphor and emitting electrons immediately as a result thereof. Examples of such a combination of input phosphor and photoelectric phosphor are given in application Serial No. 752,942, filed June 6, 1947. The electrons emitted by the photoelectric phosphor are then accelerated and focused by electron optics as shown in Figs. 1 and 2 or by secondary emission as shown in Figs. 2 and 3.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In combination, an input phosphor capable of storing a portion of the energy of radiation impinging thereon, a photoelectric surface, an electron-optical focusing system, an electron phosphor, a source of stimulating radiation to which said input phosphor is sensitive to accelerate the release of said stored energy directed toward said input phosphor, means for changing the intensity of said stimulating radiation at predetermined intervals.

2. In combination, a screen capable of absorbing the radiation to be detected and capable of emitting electrons as a result thereof when a stimulating radiation is incident thereon, a source of said stimulating radiation, electric and magnetic fields capable of focusing the electrons emitted by said screen onto a small area, means for changing the intensity of said stimulating radiation at predetermined intervals.

3. A radiation detector comprising an input phosphor sensitive to the radiation to be detected, a photoelectric surface capable of emitting electrons as a result of said radiation impinging on said input phosphor, said input phosphor emitting light and causing emission of electrons in comparatively large numbers only when a stimulating radiation is incident on it, a source of said stimulating radiation directed at said input phosphor, an electron-optical focusing system capable of focusing said electrons emitted by said input phosphor onto an output phosphor, said output phosphor, a photo-multiplier.

4. A radiation detector comprising an input screen sensitive to the radiation to be detected and capable of emitting electrons as a result thereof, said screen being capable of emitting electrons in comparatively large numbers only when a stimulating radiation is incident thereon, a source of said stimulating radiation incident on said screen, an electron-optical focusing field capable of focusing said electrons on one or more electrodes, a plurality of electrodes, a field between said electrodes capable of causing the electrons emitted by one of said electrodes to be accelerated toward other of said electrodes.

5. A radiation detector comprising an input phosphor sensitive to the radiation to be detected and capable of emitting electrons as a result thereof, said phosphor being capable of emitting electrons in comparatively large numbers only when a stimulating radiation is incident thereon, a source of said stimulating radiation incident on said phosphor, an electron-optical focusing field capable of focusing said electrons on one or more electrodes, a plurality of said electrodes, a field between said electrodes capable of causing the electrons emitted by one of said electrodes to be accelerated toward other of said electrodes, instruments connected to said electrodes to record the current between them.

6. A radiation detector comprising an input phosphor sensitive to the radiation to be detected and capable of emitting electrons as a result thereof, said phosphor being capable of emitting electrons in comparatively large numbers only when a stimulating radiation is incident thereon, a source of said stimulating radiation incident on said phosphor, said stimulating radiation being present at periodic intervals, an electron-optical focusing field capable of focusing said electrons on one or more electrodes, a plurality of electrodes capable of a high degree of secondary emission on being bombarded by electrons, a field between said electrodes capable of causing the electrons emitted by one of said electrodes to be accelerated toward other of said electrodes.

7. A radiation detector comprising an input phosphor sensitive to the radiation to be detected and capable of emitting electrons as a result thereof, said phosphor being capable of emitting electrons in comparatively large numbers only when a stimulating radiation is incident thereon, a source of said stimulating radiation incident on said phosphor, said stimulating radiation being present at periodic intervals, a plurality of electrodes capable of a high degree of secondary emission on being bombarded by electrons, a field between said electrodes capable of causing the electrons emitted by one of said electrodes to be accelerated toward other of said electrodes, said field causing said electrons to tend to focus into a narrow beam.

8. A radiation detector comprising an input phosphor sensitive to the radiation to be detected and capable of emitting electrons as a result thereof, said input phosphor being capable of emitting electrons in comparatively large numbers only when a stimulating radiation is incident thereon, a source of said stimulating radiation incident on said input phosphor, an electron-optical focusing field capable of focusing said electrons on an electron sensitive phosphor, said electron sensitive phosphor, a photo-multiplier capable of absorbing the light emitted by said electron sensitive phosphor and producing a current proportional to the intensity of the light emitted by said electron sensitive phosphor.

9. In combination, a storing phosphor capable of absorbing radiation to be detected, of storing the energy derived from that radiation over a short period of time and of emitting that energy as light more rapidly in response to infra-red radiation incident thereon, apparatus for causing said infra-red radiation to impinge on said phosphor periodically, a photoelectric layer so located with respect to said phosphor that the light produced by said phosphor will impinge on said photoelectric layer, and means for accelerating and focusing the electrons produced by said photoelectric layer.

10. A radiation detector comprising a storing phosphor sensitive to a stimulating radiation, a source of said stimulating radiation, a photoelectric layer capable of absorbing the light emitted by said storing phosphor and emitting electrons as a result thereof, said photoelectric layer being so located with respect to said storing phosphor that radiation emitted by said storing phosphor will impinge on said photoelectrc layer, means for amplifying the electron current emitted by said photoelectric layer, and means for changing the intensity of said stimulating radiation at predetermined intervals.

FITZ-HUGH B. MARSHALL.
JOHN W. COLTMAN.

REFERENCES CITED

The following references are of record in the file of this patent:

UNITED STATES PATENTS

| Number | Name | Date |
|---|---|---|
| 1,648,058 | Parker | Nov. 8, 1927 |
| 1,996,492 | Schroter | Apr. 2, 1935 |
| 2,158,853 | Coolidge | May 16, 1939 |
| 2,198,479 | Langmuir | Apr. 23, 1940 |
| 2,227,018 | Schlesinger | Dec. 31, 1940 |
| 2,239,887 | Ferrant | Apr. 29, 1941 |
| 2,270,373 | Kallmann et al. | Jan. 20, 1942 |
| 2,395,099 | Cage | Feb. 19, 1946 |
| 2,407,564 | Martin et al. | Sept. 10, 1946 |
| 2,459,778 | Larson | Jan. 18, 1949 |

OTHER REFERENCES

Microsecond Measurement of the Phosphorescence of X-ray Fluorescent Screens, Journal of Applied Physics, vol. 18, June 1947, pgs. 512–518.